UNITED STATES PATENT OFFICE.

EARLE T. OAKES, OF NEW YORK, N. Y., ASSIGNOR, BY MESNE ASSIGNMENTS, TO NATIONAL BISCUIT COMPANY, OF NEW YORK, N. Y., A CORPORATION OF NEW JERSEY.

CASEIN-TUNG-OIL PRODUCT AND METHOD OF PRODUCING THE SAME.

1,380,494. Specification of Letters Patent. Patented June 7, 1921.

No Drawing. Application filed January 19, 1920. Serial No. 352,544.

*To all whom it may concern:*

Be it known that I, EARLE T. OAKES, residing in the borough of Manhattan, city, county, and State of New York, have invented certain new and useful Improvements in Casein-Tung-Oil Products and Methods of Producing the Same, of which the following is a specification.

My invention relates to the formation of a product embodying a casein condensation product and a condensed or gelatinized form of tung oil, in uniform distribution through the mass.

Solidified casein products such as magnesium and calcium and other insoluble casein products as well as those made by condensation reaction between casein and formaldehyde are well known as plastic materials. These substances, however, are non-flexible and more or less brittle. Suitable plasticizing agents for the same have been sought, so far as I am aware without success.

I have discovered that a gelatinized form of tung oil or China wood oil may be incorporated with the casein condensation product so as to produce a solid material to which flexibility is imparted more or less in proportion to the percentage of the tung oil included therein. In compositions having a predominating proportion of the gelatinized tung oil the product is of considerable flexibility, so that a thin sheet of the same may be bent through a considerable arc without breaking or cracking in much the same manner as a thin sheet of celluloid. The resulting product is given to a considerable degree the useful properties of both the casein product and the tung oil product, the gelatinized tung oil being an insoluble material having various useful properties including a good dielectric strength. The objects of my invention are the preparation of the improved compound as a new combination of matter and also the novel methods of forming the same, as will be more fully hereinafter set forth.

I find that the improved product may be formed in either of two ways: Raw or non-gelatinized tung oil may be added to a solidified casein product, such as a reaction product of casein with formaldehyde and thoroughly mixed therewith. The mixture is then subjected to heat sufficient to gelatinize the tung oil. This may be accomplished by heating the mass at a temperature of 250 degrees C. for about nine to twelve minutes or by heating at a lower temperature for a much longer time as at a temperature of 100 degrees C. for from twelve to fourteen hours. When the product has been sufficiently heated to transform the oil to the gelatinous condition, the desired product in solid form will have been produced.

The second method of producing the compound, referred to, consists in first heating the tung oil to gelatinize the same. The gelatinized product is then put into what may be termed a colloidal solution in a suitable liquid carrier in the manner described in my application, Serial Number 352543, filed on even date herewith and entitled Impregnating and coating composition and method of preparing same. As therein set forth certain liquids may be added to the gelatinized tung oil with the effect of swelling the same to several times its original bulk and the swollen gelatinized oil, in finely subdivided form, will remain in suspension or colloidal solution in the liquid. Suitable liquids of the character referred to are well known solvents for gums and the like such as solvent naphtha, turpentine, ethyl and methyl alcohol, carbon tetrachlorid, ether and acetone. The gelatinized tung oil is preferably ground or comminuted in the presence of a sufficient quantity of solvent or liquid carrier to remove the tackiness of the gelatinized product to a considerable extent so that the same may readily be ground or comminuted, after which more of the liquid may be added if necessary to make a free flowing liquid containing the particles of gelatinized tung oil.

When such a collodial solution of gelatinized tung oil has been prepared the same may be added to the casein condensation product and the ingredients thoroughly mixed. After this it is merely necessary to apply a sufficient amount of heat to drive off the solution or liquid and dry the product whereupon the desired composition will be formed.

The casein condensation product utilized in the process may be prepared in any of the well known ways. While I have referred to the same as a condensation product of casein and formaldehyde, it will be understood that bodies other than formaldehyde containing the methylene radical and capable of reacting on casein to form a condensation product, may be used.

A suitable method of procedure is to place the casein in a slightly alkaline water solution. This is treated with formaldehyde which results in the precipitation of a sticky mass, comprising the condensation product referred to. The tung oil in its common or ungelatinized condition, or gelatinized oil in colloidal solution, may be thoroughly mixed with the casein product referred to and the process carried to completion in the manner described above.

The compound may be formed in proportions which seem to range from almost 100 per cent. of the casein condensation product, to almost 100 per cent. of the gelatinized tung oil. When the product contains a predominating amount of the casein condensation product the tung oil product acts as a plasticity agent, to reduce brittleness, eliminate internal stresses and promote flexibility. A product consisting of approximately equal parts of the casein product and the tung oil product is somewhat flexible and when containing two parts of the tung oil to one part of the casein condensation product is quite flexible. When the tung oil product predominates in the composition the casein product acts to increase the strength and body of the composition. The final composition contains both ingredients distributed quite uniformly through the mass. The compound seems to be in the nature of an emulsion of the casein condensation product in the gelatinized tung oil.

If the product is to be used as a molding composition a desired form may be given to the product by preparing the same in a suitable mold. The final product, when a considerable proportion of the casein is included therein, is fairly hard and may be prepared with a smooth surface.

It will be understood that my invention is not strictly limited to the exact details particularly set forth herein but is as broad as is indicated by the accompanying claims.

What I claim is:

1. A new composition of matter, comprising a solid product containing a hardened casein product and gelatinized tung oil, uniformly distributed through the mass.

2. A new composition of matter, comprising a solid product, flexible in thin strips, containing a hardened casein product and a gelatinous form of tung oil.

3. The process of producing a casein tung oil product, comprising, thoroughly mixing together in finely subdivided form a solidified casein product and gelatinized tung oil.

4. The process of producing a casein tung oil product, comprising, forming a casein condensation product, thoroughly mixing tung oil therewith, and heating the mixture sufficiently to form a solid product.

5. The process of producing a casein tung oil product, comprising forming a casein condensation product, heating tung oil to gelatinize the same, subdividing the gelatinized product and adding a liquid, adapted to contain the subdivided product in suspension, mixing the casein condensation product and said liquid with its contained gelatinized tung oil, and heating the mixture to dry out the product.

6. The process of producing a casein tung oil product, comprising treating casein in an alkaline solution with formaldehyde, adding tung oil to the resulting precipitated mass, thoroughly mixing, and heating the mixture sufficiently to form a solid product.

This specification signed and witnessed this 15th day of January, 1920.

EARLE T. OAKES.

Witnesses:
CLARKE E. DAVIS,
D. J. MAVERTY.